United States Patent
Palmer et al.

(10) Patent No.: US 6,829,929 B2
(45) Date of Patent: Dec. 14, 2004

(54) LOADING PROBE FOR TESTING AN ACOUSTIC TRANSDUCER

(75) Inventors: Kenneth Frank Palmer, Fife (GB); Richard Arthur Pethrick, Glasgow (GB); Ian Rhoney, Glasgow (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 10/415,828

(22) PCT Filed: Nov. 7, 2001

(86) PCT No.: PCT/GB01/04925

§ 371 (c)(1),
(2), (4) Date: May 2, 2003

(87) PCT Pub. No.: WO02/39075

PCT Pub. Date: May 16, 2002

(65) Prior Publication Data

US 2004/0050140 A1 Mar. 18, 2004

(30) Foreign Application Priority Data

Nov. 10, 2000 (GB) .............................. 0027461
Sep. 22, 2001 (GB) .............................. 0122920

(51) Int. Cl.$^7$ ........................... H04R 29/00; G01H 3/00
(52) U.S. Cl. ........................................ 73/186
(58) Field of Search ................................ 73/1.82–1.86

(56) References Cited

U.S. PATENT DOCUMENTS

| 4,331,021 A | * | 5/1982 | Lopez et al. ................. 73/1.86 |
| 4,453,408 A | | 6/1984 | Clayman |
| 4,475,376 A | | 10/1984 | Keilman |
| 4,747,295 A | * | 5/1988 | Feist et al. .................... 73/1.86 |
| 4,838,070 A | * | 6/1989 | Bradley ....................... 73/1.86 |
| 4,959,992 A | * | 10/1990 | Gentles ....................... 73/1.83 |
| 5,114,982 A | | 5/1992 | Mendelsohn et al. |
| 5,327,771 A | * | 7/1994 | Gentles ....................... 73/1.86 |

FOREIGN PATENT DOCUMENTS

| EP | 0 305 519 A | 3/1989 |
| EP | 0 339 823 A | 11/1989 |
| EP | 0 426 276 A | 5/1991 |
| EP | 0 522 705 A | 1/1993 |
| GB | 1 303 516 A | 1/1973 |
| GB | 2 217 952 A | 4/1989 |
| GB | 2 222 746 A | 7/1989 |
| GB | 2 217 952 A | 11/1989 |
| GB | 2 218 593 A | 11/1989 |
| GB | 2 259 427 A | 6/1992 |
| GB | 2 259 427 A | 3/1993 |

* cited by examiner

Primary Examiner—Hezron Williams
Assistant Examiner—Rose M. Miller
(74) Attorney, Agent, or Firm—Crowell & Moring LLP

(57) ABSTRACT

A loading probe includes an elongated solid first body portion (1) shaped from a first material and capable of simulating the normal acoustic impedance presented to a transducer to be tested by a medium in which the transducer is to operate and a second elongated solid body portion (2) made from an acoustically absorbent material having acoustic impedance characteristics substantially matched with those of the first material from which the first body portion (1) is made. The material from which the second body portion (2) is made is chosen so as to be mouldable to the first body portion (1) to form the second body portion (2).

52 Claims, 4 Drawing Sheets

LOADING PROBE FOR TESTING AN ACOUSTIC TRANSDUCER

The present invention relates to a loading probe for testing an acoustic transducer at ultrasonic frequencies, which is particularly, but not exclusively, suitable for testing an underwater acoustic transducer in air.

Transducers such as piezoelectric transducers may be tested by simulating the normal acoustic impedance presented to them in the medium, such as a liquid, for example water, in which they are intended to be operated. Such transducers are intended to generate or detect acoustic signals.

GB-B-2259427 and GB-B-2217952 both describe loading probes which are for the testing in air of electro acoustic transducers and which have been used successfully at frequencies in the single figure kHz range. At such low frequencies high power requirements can be satisfied with relatively low power density (flux) values because of the relatively large dimensions of the probe at such frequencies where a typical power density (flux) would be of the order of 0.5 W per $mm^2$ cross-sectional area. Such known loading probes can also be used at ultrasonic frequencies of tens of kHz provided the power density (flux) levels are kept to a maximum level of 0.5 W per $mm^2$ cross-sectional area. Because of the reduction in wavelength and consequent dimensions, however this restricts operation at ultrasonic frequencies to low power levels, whereas for similar high power applications power density (flux) requirements are significantly higher in the order of 5.0 W per $mm^2$ cross-sectional area. Whilst the loading probes of GB-B-2217952 and GB-B-2259427 are generally successful they are not suitable for high power testing at ultrasonic frequencies partly by virtue of their design and construction and partly by virtue of the materials from which they are made. For example at power densities (flux) of the order of 5.0 W per $mm^2$ cross-sectional area the material, which is generally an acrylic polymer from which the probe is made is heated and at temperatures in the range of 30° C. to 40° C. the acoustic absorption increases by the onset of beta-relaxation which leads to thermal runaway so that the material rapidly softens as it reaches glass transition temperature. This not only significantly alters the acoustic absorption characteristics but detrimentally reduces the working life of the probe.

Additionally the construction of such known probes is such that the main body of the probe is hollow and contains an acoustically absorbent material which is usually a partially polymerised metal loaded epoxy resin. At ultrasonic frequencies this material has an undesirably high acoustic loss factor leading to rapid heating of the resin over a short length at the beginning of the volume formed by the loading probe tube so that at elevated temperatures above room temperature the resin acoustically absorbent material starts to age as it Is not a stable system. At higher temperatures the material can become liquid and age rapidly whereupon the material hardens and becomes discontinuous with the remaining material of the probe. This causes reflections and renders the probe unsuitable for further use.

There is thus a need for a generally improved loading probe which is able to operate at ultrasonic frequencies without degradation of material properties as may be experienced by the conventional loading probes of GB-B-2217952 and GB-B2259427 as described above.

According to a first aspect of the present invention there is provided a loading probe for testing an acoustic transducer, including an elongated solid first body portion for carrying a piezo-electric test element, which elongated solid first body portion is shaped from a first material and capable of simulating the normal acoustic impedance presented to a transducer to be tested by a medium in which the transducer is to operate, and an elongated solid second body portion made from an acoustically absorbent material having acoustic impedance characteristics substantially matched with those of the first material from which the first body portion is made, with the second body portion being attached at one end to one end of the first body portion, characterised in that the second body portion is substantially rod like in shape and the material from which the second body portion is made is an elastomeric polyurethane having an absorption coefficient higher than that of said first material over a temperature range of 5° C. to 130° C.

Preferably the elastomeric polyurethane material contains silicon dioxide, silicon nitride, tungsten powder, tungsten carbide, tungsten boride, tungsten silicide, molybdenum powder, molybdenum carbide, molybdenum nitride, tantalum powder, tantalum carbide or tantalum nitride in an amount chosen to match the acoustic impedance of the second body portion material to that of the first body portion material.

Conveniently the second body portion is made from discrete stages or layers of elastomeric polyurethane material, with each stage or layer having differing properties sequentially along the second body portion.

Alternatively the second body portion is made from continuously graded elastomeric polyurethane material.

Conveniently the first material from which the first body portion is made is a polycarbonate, polyethylene terephthalate or polyethersulphone having a low absorption coefficient over a temperature range of 5° C. to 200° C.

Conveniently the first and second body portions are attached to one another by a projection provided at one end of one body portion engaging in a correspondingly shaped recess provided in one end of the other body portion.

Advantageously the projection and recess are conical in shape.

Preferably the second body portion utilised is formed by moulding.

Conveniently the loading probe is constructed and dimensioned to simulate the operating medium.

Advantageously the loading probe is operable to test an acoustic transducer in air.

Preferably the first body portion is substantially circular in cross section having a waisted profile formed by two intersecting opposed frusto-conical sections, dimensioned to assist matching of the acoustical impedance of the first body portion to that of the medium in which the transducer to be tested is to operate.

Advantageously the piezoelectric test element is carried by the first body portion intermediate the ends of the first body or at the end of the first body portion opposite to said one end thereof.

According to a second aspect of the present invention, there is provided measurement apparatus comprising two loading probes as described above arranged end to end with material to be measured sandwiched therebetween.

For a better understanding of the present invention, and to show how the same may be carried into effect reference will now be made, by way of example, to the accompanying drawings in which.

A loading probe according to the present invention can be used for testing an acoustic transducer in air to simulate use in any suitable medium in which the transducer is to be employed. Preferably the loading probe simulates operation of the transducer in a liquid medium such as water and simulates not only the acoustic absorbing characteristics of the medium but also in the case of a liquid medium such as water, the pressure characteristics thereof.

Figure 1:
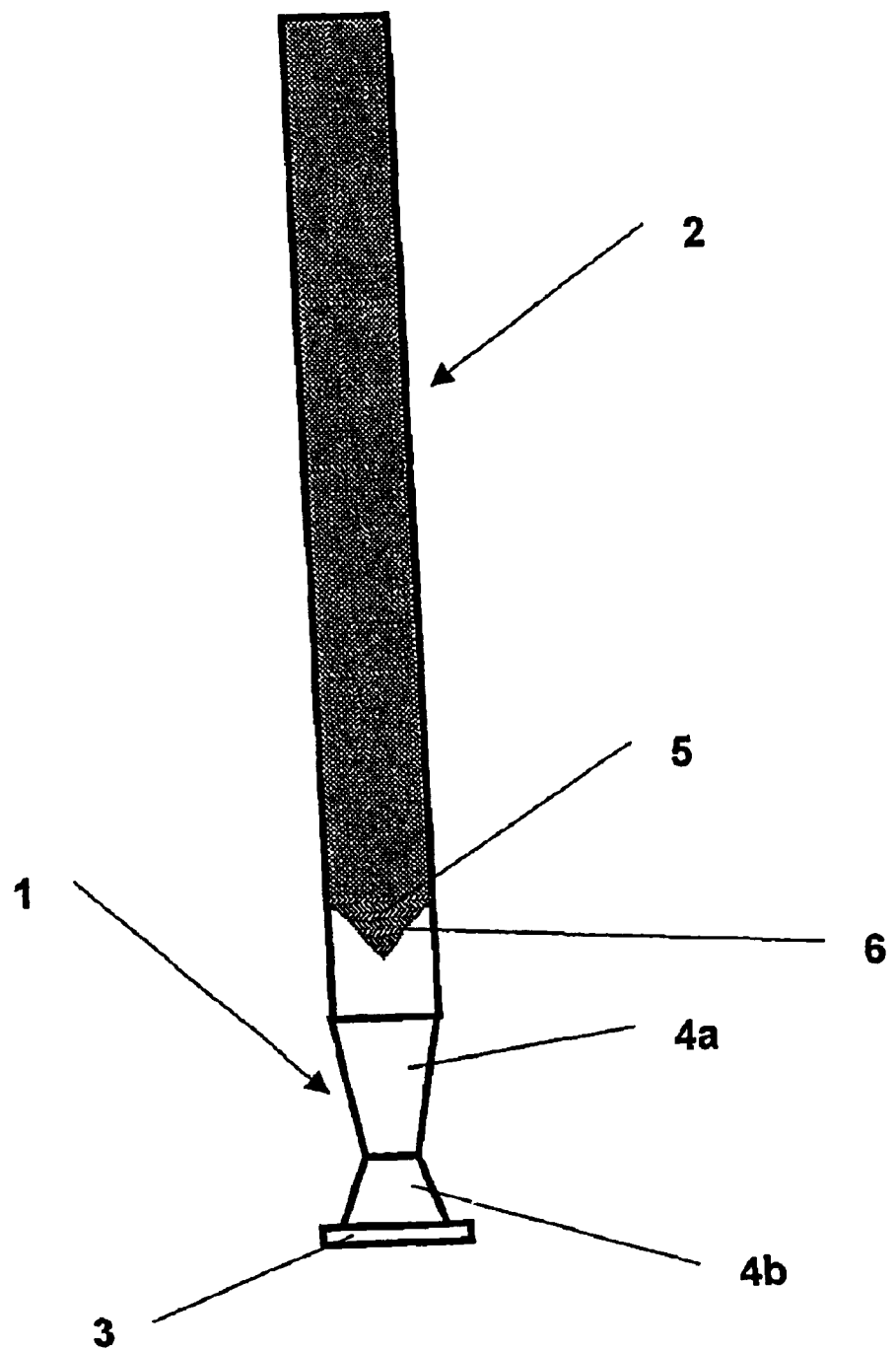
FIG. 1 is a plan view of a loading probe according to a first embodiment of the present invention.

As can be seen from FIG. 1 of the accompanying drawing, a loading probe according to a first embodiment of the present invention for testing an acoustic transducer at ultrasonic frequencies includes an elongated solid first body portion 1 and an elongated solid second body portion 2. The first body portion has a first end 3 for carrying a piezoelectric test element. The purpose of the probe of the present invention is to present a complex mechanical impedance to a transducer which corresponds to the load which the transducer experiences when in its normal operating medium, for example, water. In use the test element applied to the end 3 of the probe is placed in contact with the head of a transducer being tested (not shown) in air and can either transmit or receive acoustic radiation.

The elongated solid first body portion 1 of the probe of the present invention is shaped from a first material and is capable of simulating the normal acoustic impedance presented to a transducer to be tested by a medium in which the transducer is to operate such as a liquid medium, such as water. As illustrated the first body portion 1 is substantially circular in cross section and has a waisted profile formed by two intersecting opposed frusto-conical sections 4a and 4b dimensioned to assist matching of the acoustical impedance of the first body portion 1 to that of the medium in which the transducer to be tested is to operate. Preferably the material from which the first body portion 1 is made is a polycarbonate, polyethylene terephthalate or polyethersulphone having a low absorption coefficient over a temperature range of 5° C. to 200° C. The most favoured material is polyethersulphone which is a tough and stable material which simulates a good impedance match to water that changes little when its temperature is raised slightly during high power operation. The beta-relaxation phenomenon occurs at minus 100° C. so there is little change of absorption coefficient with temperature in the working range of from 5° C. to 200° C. The impedance match to water is achieved over an octave frequency by the waisted configuration provided by the two frusto-conical sections 4a and 4b. By the term 'octave' is meant frequency doubling as is well known in art. A typical frequency range over which the octave can be achieved is from 1 to 50 kHz and one probe can operate in that range, for example, for 1 to 2 kHz, 5 to 10 kHz, 25 to 50 kHz or any other suitable range in which the frequency can be doubled.

The probe of the present invention as illustrated in FIG. 1 of the accompanying drawings also includes the elongated solid second body portion 2 which is made from an acoustically absorbent material having acoustic impedance characteristics compatible with those of the first material from which the first body portion 1 is made. The second body portion 2 is attached in any convenient manner at one end to a second end of the first body portion 1. As illustrated this is achieved by providing a projection 5 at one end of one body part such as of the second body part 2 which projection 5 engages in a correspondingly shaped recess 6 provided in one end of the other body portion which in the illustrated example is the first body portion 1. The projection 5 and recess 6 preferably are conical in shape.

The second body portion 2 is substantially rod like in shape and the material from which it is made is an elastomeric polyurethane having an absorption coefficient higher than that of the first body portion material over a temperature range of 5° C. to 130° C. A suitable elastomeric polyurethane is obtained from a polymeric methylene diphenyl diisocyanate or equivalent reacted with a polyol. The polyol is di- or multi-functional and is molar mass adjusted to give the required acoustic and mechanical properties. The polyurethane formulations may contain a suitable chain extender, for example (1, 4) butane diol, and may incorporate an appropriate catalyst.

It will readily be understood that the absorber material has been developed to produce an optimum balance between the conflicting requirements of achieving total absorption of acoustic energy and having a large thermal mass to permit significantly useful high power operation without degrading the absorber. For optimum results, it is important that the formulation described below is followed and in particular that there is no foaming of the polyurethane mix. Special attention is therefore required to the drying of material under vacuum prior to mixing, and thorough degassing during mixing.

A list of chemicals required for making the elastomeric polyurethane (absorber material) is shown Table 1 below.

TABLE 1

| Material | Description |
| --- | --- |
| Polyol | Daltocel F438 |
| Diisocyanate (polymeric MDI) | Suprasec 5005 |
| Chain extender | 1,4 butane diol |
| Catalyst | Thorcat 535 |
| Silicon nitride (powder) | 325 mesh, predominantly beta phase, CAS No: 12033-89-5. Product No. 248622. Purity Grade: Extra Pure. |

Technical descriptions for these polyurethane reactants and filler are given below:

Polyol: Daltocel F438

This product is initiated with a diethylene glycol glycerol mixture. It is then extended with propylene oxide and capped with a 20.6% ethylene oxide tip. The resultant product is approximately 2.2 functionality and provides a good quality elastomer with a sharp cure when well formulated. Viscosity 900 cp at 25° C., OH value 35.

Chain Extender: 1,4 Butane Diol 1,4 butane diol is extensively used as a chain extender in polyurethane elastomers. However, the product is prone to crystallisation at temperatures below 10° C. in blends and hence is normally kept in a warm environment. OH value 1246, Equivalent weight 45.

Diisocyanate: Suprasec 5005

This product is commonly known as Polymeric MDI. It has an average functionality of 2.7, an NCO content of 30.7% and a viscosity of 230 cp at 25° C. In the formulation given herein, it is used at approximately 25% above the stoichiometric ratio.

Catalyst: Thorcat 536

This is a mercury based catalyst which favours the urethane reaction over the water isocyanate reaction and is hence extensively used in elastomers.

Silicon Nitride: $Si_3N_4$

Most importantly, silicon nitride is hydrophobic and significant quantifies can be incorporated without adversely affecting the processing limitations. Silicon nitride occurs in two forms, α and β, with similar crystal structures but with the following cell dimensions:

For α: a=7.753 Å, c=5.623 Å;

And for β: a=7.603 Å, c=2.906 Å.

The β phase is the more stable high temperature phase and no convincing demonstration of the β→α transformation has been reported. The silicon nitride specified above is predominantly β phase with a particle size quoted as 325 mesh.

It will be appreciated that attention is to drawn to thee various manufacturers' Health and Safety Data Sheets for the above products, which must be followed. In particular, it is imperative that fumes of the diisocyanate which contain a polymeric MDI are not inhaled.

A typical formulation for a polyurethane material is shown in Table 2 below.

TABLE 2

| Material | Percentage by weight |
|---|---|
| Polyol | 35.4 |
| Diisocyanate | 28.7 |
| Chain extender | 6.4 |
| Catalyst | 0.1 |
| Silicon nitride (powder) | 29.4 |

Where changes are required to the absorption level for a particular application, the chain extender level should be varied in the first instance, a change of +0.5% causing a small but useful decrease in absorption coefficient.

Such solid polyurethane materials exhibit good ageing characteristics and hence provide a longer working life for the loading probe provided that a material temperature of 130° C. is not exceeded. In particular, these ageing characteristics are enhanced by post-curing the absorber at elevated temperatures. The composition of the polyurethane material may be varied to achieve a range of absorption coefficients which can be selected to match a particular frequency for the characteristics of the transducer being tested. The precise selection of elastomeric polyurethane composition may include the use of either a number of discrete stages or layers within the body portion 2 each with differing properties in a sequential manner that is with each stage or layer having differing properties sequentially along the body portion 2, or a continuously graded material.

It is desirable that the acoustic impedance of the material from which the second body portion is made should match that of the first material from which the first body portion is made. For the acoustic impedance of the material from which the second body portion is made to match the material from which the first body portion is made, the following relationship must be met:

$$\rho_1 \times c_1 = \rho_2 \times c_2$$

where $\rho_1$ is the density of the material from which the first body portion is made;

$\rho\rho_2$ is the density of the material from which the second body portion is made;

$c_1$ is the speed of sound in the material from which the first body portion is made; and $c_2$ is the speed of sound in the material from which the second body portion is made.

Moreover, the reflection coefficient for the two materials is defined as:

$$(\rho_1 c_1 - \rho_2 c_2)/(\rho_1 c_1 + \rho_2 c_2)$$

As the acoustic impedance of polyethersulphone is higher than that of the elastomeric polyurethane material an addition can be made to the polyurethane material of a substance having a higher acoustic impedance than that of the material from which the second body portion 2 is made so that a match of acoustic impedance can be more readily achieved to minimise unwanted reflections. To this end the elastomeric polyurethane material preferably contains silicon dioxide, silicon nitride, tungsten powder, tungsten carbide, tungsten boride, tungsten silicide, molybdenum powder, molybdenum carbide, molybdenum nitride, tantalum powder, tantalum carbide or tantalum nitride in an amount up to 10% by volume chosen to match the acoustic impedance of the second body portion material to that of the first body portion material.

The construction used for both the first and second body portions 1 and 2 according to the present invention is important. In the loading probes of GB-B-2259427 and GB-B-2217952 the elongated body part equivalent to the second body portion 2 of the present invention was tubular containing a cavity into which an elongated convergent portion provided on the first body portion extended leaving a volume inside the tubular part which was filled with acoustic absorbent material in a liquid state prior to curing. Such a form of construction has proved to be a difficult task to achieve with the smaller probe dimensions required for operation at ultrasonic frequencies without entrapment of air voids which provide undesirable and significant reflections. In this first embodiment of the present invention, the use of acoustic absorbent material for the second body portion 2 without the need to constrain said material within a tube enables this to be made completely solid which thereby avoids such problems. Additionally the need for machining of complex elongated bodies and tubes is avoided as is the subsequent filling operation. The thermal capacity is significantly increased which further increases the high power capability for the loading probe of the present invention in which the manufacturing process for the second body portion 2 can be accomplished simply by moulding the second body portion 2 made from acoustic absorbent material directly on to the first body portion 1 which may also be produced by moulding or by machining.

Figure 2:
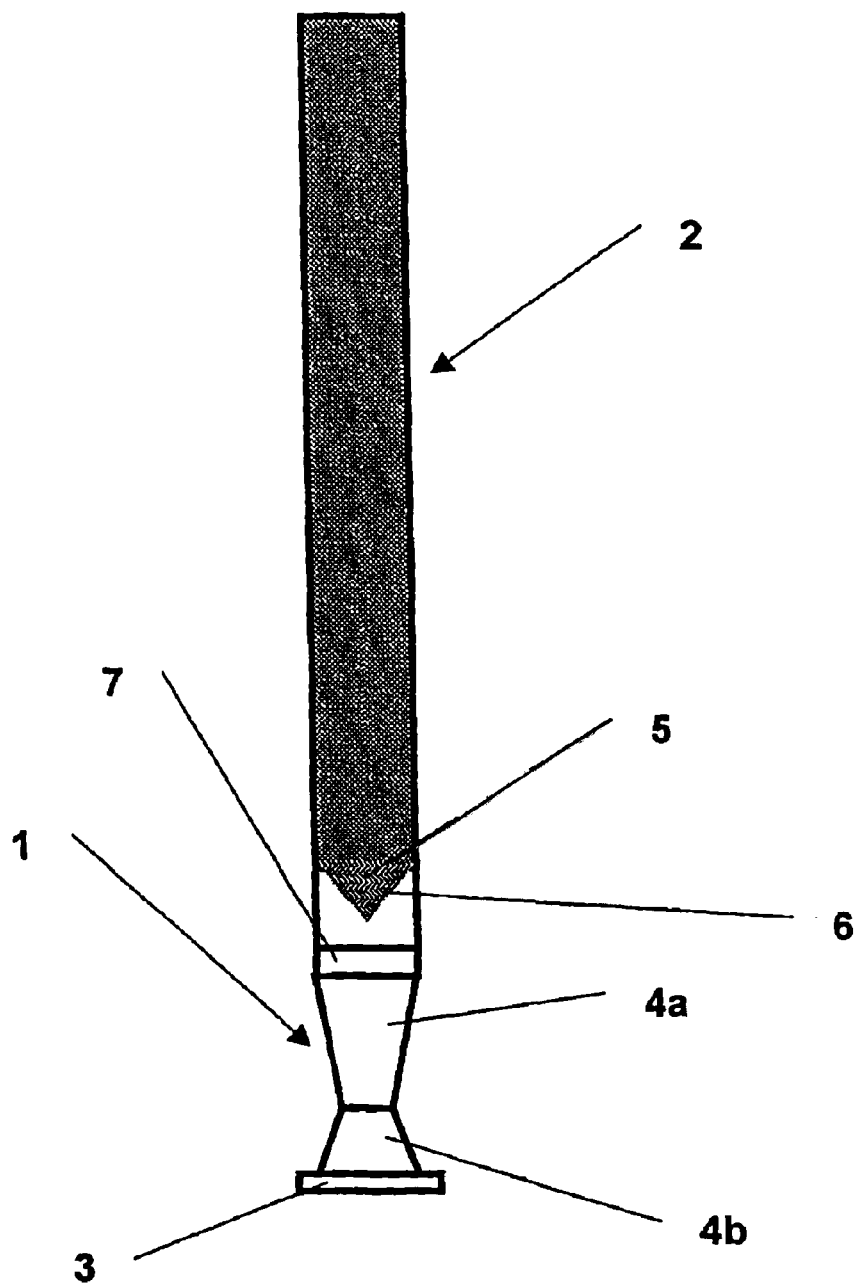
FIG. 2 is a plan view of a loading probe according to a second embodiment of the present invention.

A loading probe according to a second embodiment of the first aspect present invention as illustrated in FIG. 2 of the accompanying drawings basically is the same as that of the first embodiment of FIG. 1 and like parts have been given like reference numbers and will not be further described. However in the embodiment of FIG. 2 the piezo-electric test element 7 is not located at end 3 of the first body portion 1 but intermediate the ends 3 and 6 as shown. The element 7 may be attached to the body portion 1 in any convenient manner such as by attachment around the body portion circumference or by insetting therein.

Figure 3:
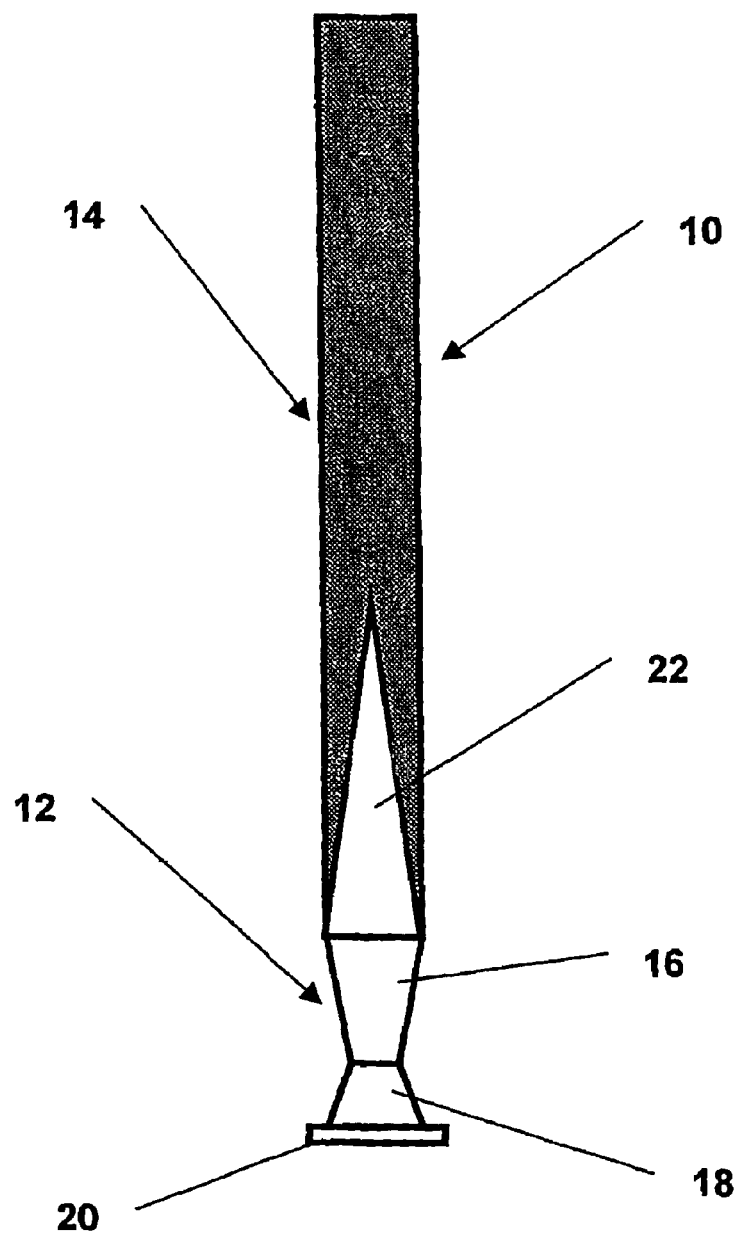
FIG. 3 is a plan view of a loading probe according to a third embodiment of the present invention.

FIG. 3 illustrates a third embodiment of a loading probe 10 in accordance with the present invention. This embodiment is for the extended application of high power, the thermal capacity of the second body portion and hence the total test time available being further increased by the effect of dynamic/transitional heating. A typical maximum thermal capacity is around 20 kJ and for a power of 500 W, a maximum continuous test time is 40 s and for a pulsed test time, duly cycle of 1:10, the maximum test time is 400 s i.e. over 6 minutes. It will be understood that for a maximum thermal capacity of 20 kJ, any suitable combination of power and test time can be employed. With this embodiment, power densities of up to 5 W per $mm^2$ can easily be achieved. The absorption coefficient of the polyurethane materials employed is such that it gradually increases as the temperature rises during operation. In this instance, it is necessary for the first body portion to have an elongated convergent portion extending up to 50% inside the total length of the second body portion as shown in FIG. 3. The probe 10 is similar to the probes of FIGS. 1 and 2 and comprises a first solid body portion 12 and a second body portion 14. As before, the first body portion 12 has a waisted configuration provided by two frusto-conical sections 16 and 18. A first end 20 of the probe 10 is in contact with a head of a transducer (not shown) which is to be tested.

A piezo-electric test element (not shown) is also included in the loading probe 10. The piezo-electric test element may be located in a similar position to that shown in FIG. 2, that is, in the first body portion 12.

In this third embodiment of the present invention, first body portion 12 comprises a convergent cone portion 22 which extends into the second body portion 14 as shown.

As before, the first body portion 12 may comprise a polycarbonate, polyethylene terephthalate or polyethersulphone material which has a low absorption coefficient over a temperature range of 5° C. to 200° C. However, the most favoured material is polyethersulphone which is tough and stable as described above. The second body portion 14 is substantially rod like in shape and comprises an elastomeric polyurethane having an absorption coefficient which is higher than that of the first body material over a temperature range of 5° C. to 130° C.

In this embodiment, the second body portion 14 may be moulded onto the convergent cone portion 22 of the first body portion 12. A thin-walled tube (not shown) is attached to the first body portion 12 surrounding the convergent cone portion 22 to define a volume to be filled in the moulding process.

The internal volume of the tube (not shown) to be filled with absorber material is shown diagrammatically in FIG. 3 by the shading. It will readily be appreciated that it is essential that the absorber material is free from voids, air bubbles etc., and this is particularly critical in the areas where the material of the second body portion 14 meets the convergent cone portion 22 adjacent the tube (not shown). Because the absorber material has to completely fill the complex tapering volume, it has been found to be impossible to meet this requirement without (a) firstly evacuating air from the volume to be filled, or (b) utilising a filling hole bored through the side of the tube wall.

An example of a method for filling the tube will now be described. Naturally other suitable methods may be employed provided they produce a loading probe which meets the requirements as described above.

EXAMPLE

First, the first body portion 12 is attached to the tube (not shown) to form a sub-assembly. Internal surfaces of the subassembly will have previously been prepared and cleaned. Care should be taken to ensure that no contaminants are allowed to come into contact with the bonding surfaces, that is, the outer portion of the convergent cone portion 22. In particular, all traces of moisture must be eliminated as it is essential to minimise foaming even in the micro scale.

As discussed above, it is necessary to evacuate air from the volume to be filled. Successful results have been obtained using a vacuum line coupled to a two stage rotary pump.

Prior to filling the volume between the thin walled tube and the convergent cone portion 22 of the first body portion, a mix of the elastomeric polyurethane needs to be made. This is done by:

(i) Heating the polyol to a temperature of 50° C. under vacuum whilst stirring with a magnetic stirrer until the vacuum shown on the vacuum gauge reaches <0.1 mbar. At this vacuum, the polyol may be stored under vacuum until required.

(ii) Heating the chain extender to a temperature of 60° C. under vacuum whilst stirring with a magnetic stirrer until the vacuum shown on the vacuum gauge reaches <0.1 mbar. Again, the chain extender can be stored under vacuum until required.

(iii) Heating the diisocyanate to room temperature again stirring and under-vacuum.

(iv) Drying the silicon nitride thoroughly. One way of doing this is to heat the silicon nitride for 24 hours at 500° C. in a muffle furnace.

As the polymer reaction is exothermic, it will be understood that the larger the volume to be filled, the faster the reaction will be assuming that the heat generated cannot be dissipated. In order to maximise the process window, that is, the time in which the filling can be carried out, it is recommended to fill the absorber assembly in two distinct stages. Stage 1 fills the assembly to just above the end of the convergent cone section 22 and stage 2 fills the remaining volume to a predetermined underfill. Two mixes may be required to carry out this two-stage process.

During mixing, it is still very important to minimise the uptake of moisture at this stage. The polyol, chain extender and catalyst can be weighed into a container, for example a small beaker, and the silicon nitride added and mixed by hand. The resulting mixture is degassed until a vacuum of 0.1 mbar is obtained. Next, the required amount of diisocyanate is added and thoroughly mix mechanically. As pot life is now an issue, the resulting mixture should be degassed for 4 minutes only.

Successful filling is carried out by using a specially made glassware system which is attached to a vacuum line. The polymer mix produced as described above is poured into a flask within the glassware system and degassed until the vacuum reached 0.1 mbar. Another part of the vacuum line contained the absorber sub-assembly to be filled and is attached to the flask containing the polymer mix. Upon reaching the required vacuum, the mix is poured gradually, still under vacuum, into the evacuated sub-absorber assembly. The absorber assembly is maintained at an acute angle until the mixture completely surrounded the cone in the sub-assembly. At this time, the assembly is moved to a vertical position and the vacuum gradually released and then replaced by a pressure of up to 10 bar. Such a pressure forces the polymer mixture into the lowest section of the assembly.

The method described above is by way of example only and is not to be considered as being mandatory. However, it is important that a method of filling the absorber sub-assembly is developed that suits the available facilities and takes advantage of local know-how. As an alternative, it may be possible to drill a small hole in the tube wall, upon which an alternative filling method may be employed, but only provided that the requirements described above are met. Alternative filling methods may then be used such as:

(a) Injection of the absorber material via the tube wall hole, possibly aided by evacuation at the tube end, or (b) Pressurised injection of the absorber material via the open end of the tube, again possibly aided by evacuation, in this case via the tube wall hole.

The filled assembly has to be cured at a high temperature in order to establish a stable material which does not age when subjected to high power operation. The optimum cure will be at 120° C. for 24 hours, after which a maximum probe surface temperature of 90° C. can be tolerated during high power operation. Care should be taken prior to curing, as some parts have a tendency to split when subjected to this temperature. However, this problem may be solved by machining the outside diameter of the tube after curing and using a constraining sleeve during the cure time.

An alternative curing process would be at 100° C. for 96 hours, after which a maximum probe surface temperature of 70° C. can be tolerated. In all cases, the absorber assembly should be treated to gradual heating and cooling temperature profiles.

As a check, the density of the cured absorber material prepared as described above should be around 1440 kg/m³.

On initial application at power and at room temperature, the profile of the elongated convergent portion is such that, there is a maximum heating of the (absorbing) second body portion at a portion, say, of one third along the total length of the second body portion. As the temperature rises in this region so the absorption coefficient rises locally within this region. This, in turn, causes a greater proportion of the power to be absorbed on the first body portion side of the hottest position of the second body portion. Thus, as power continues to be applied, heating progresses toward the first body portion. This gives a thermal capacity several times that for the case with no elongated convergent portion, when the maximum temperature rise will be at the interface between the first and second body portions with no dynamic/transitional heating effect possible.

A second aspect of the present invention concerns the use of an acoustically absorbing material that can be formulated to match the complex acoustic impedance of a second material and which comprises an elastomeric polyurethane. A typical formulation is given in Table 2 and by varying either the chain extender content and/or the diisocyanate content changes can be made to the absorption coefficient. Further, the acoustic impedance of the acoustically absorbing material can be modified by the addition of compounds such as silicon dioxide, silicon nitride, tungsten powder, tungsten carbide, tungsten boride, tungsten silicide, molybdenum powder, molybdenum carbide, molybdenum nitride, tantalum powder, tantalum carbide or tantalum nitride.

Such an acoustically absorbing material may have many applications and may take many shapes and sizes according to the particular application, for example, the material may be used to form an acoustic tile.

A third aspect of the present invention concerns an application for the loading probe described herein for the measurement of the acoustic properties of materials such as absorption coefficient and velocity of sound. For this it is required to use two loading probes such that their probe ends 3 (FIGS. 1 and 2) and 20 (FIG. 3) are placed face to face, with a sample of the material to be tested placed in between these two faces. This is shown in FIG. 4 and it is noted for this application that there is no requirement for the frusto-conical sections 4a and 4b (FIGS. 1 and 2) and 16 and 18 (FIG. 3) as there is no need to match the acoustic impedance of a transducer.

Figure 4:
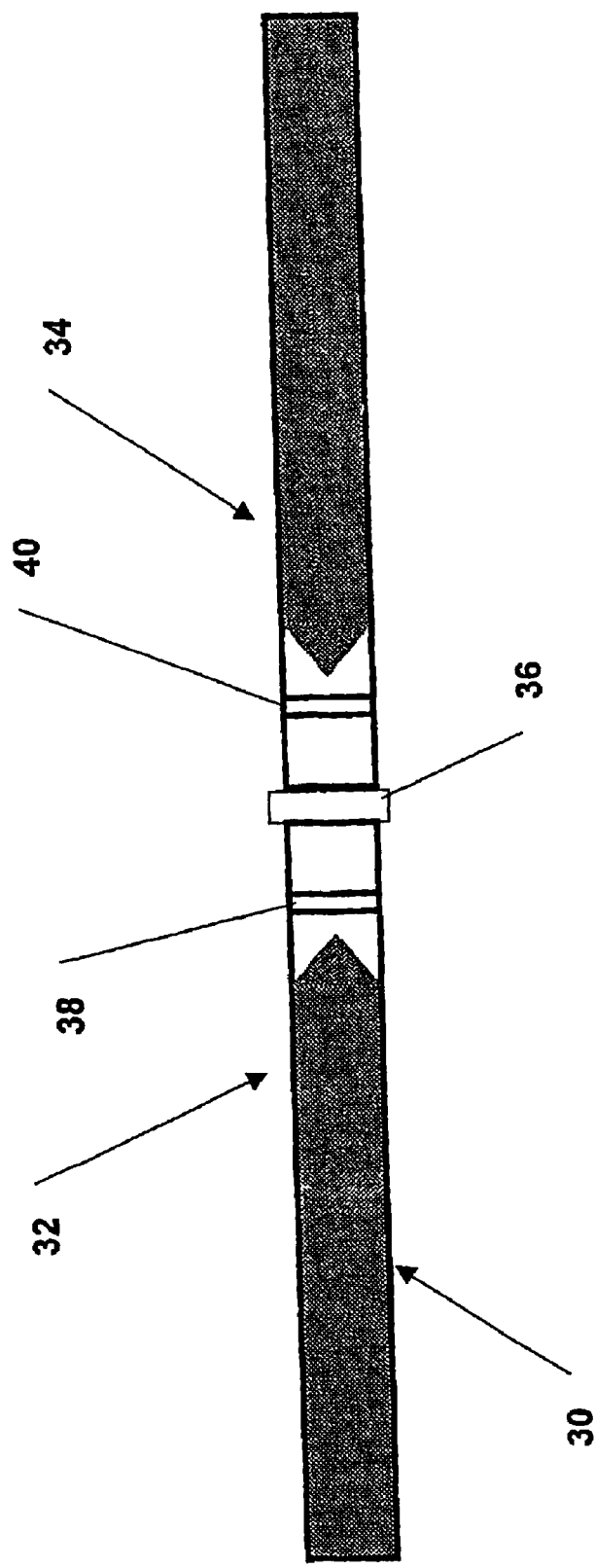
FIG. 4 is a plan view of a materials testing arrangement which utilises two loading probes.

Also the power requirements are low hence in FIG. 4, measurement apparatus 30 is shown which comprises two probes 32, 34 as described above with reference to FIG. 2 placed end to end so as to sandwich a material 36 to be tested as shown. In this arrangement, the probes 32, 34 are of constant cross-section as shown. Each probe 32, 34 includes a piezo-electric test element 38, 40. The test element 38 in probe 32 may be used to provide acoustic signals for the material 36 and the test element 40 in probe 34 may be used to receive signals passing through the material 36. Naturally, either probe 32, 34 may be used as the transmitter or the receiver.

The material to be tested can have a diameter of any suitable size depending on the measurements to be taken. The thickness of the material is typically greater than λ/10 where λ is the wavelength of the acoustic signals used in the test process.

Naturally, it will be understood that, although the measurement apparatus 30 shows the probes similar to that shown in FIG. 2, the probes of FIGS. 1 and 3 could equally be used.

Tests are carried out by transmitting on one of the piezo-electric test elements (not shown) and measuring the received signal characteristics on the other piezo-electric test element (also not shown). By using appropriate algorithms, the reduction in signal amplitude can be used to derive absorption coefficient data. By measuring the phase delay in receiving the signal at the second piezo-electric test element, phase velocity data can be derived.

Moreover, by using this method, advantage is taken of a unique property inherent with the design of loading probe. Because of the totally absorbing nature of the second body portion, changes in acoustic impedance presented to the end faces 3 (FIGS. 1 and 2) and 20 (FIG. 3) do not have any impact upon the acoustic loading experienced by, and hence operation of, the piezo-electric test element as a transmitter. This is because the second body portion totally dominates the behaviour of the piezo-electric test element. Thus, the transmitted signal is constant, whatever the nature of the sample of material to be measured. In practice, absorption coefficients have been measured with a repeatability of to ±0.01 dB/mm.

What is claimed is:

1. A loading probe for testing an acoustic transducer, including an elongated solid first body portion for carrying a piezo-electric test element, which elongated solid first body portion is shaped from a first material and capable of simulating the normal acoustic impedance presented to a transducer to be tested by a medium in which the transducer is to operate, and an elongated solid second body portion made from an acoustically absorbent material having acoustic impedance characteristics substantially matched with those of the first material from which the first body portion is made, with the second body portion being attached at one end to one end of the first body portion, characterised in that the second body portion is substantially rod like in shape and wherein the material from which the second body portion is made is an elastomeric polyurethane having an absorption coefficient higher than that of said first material over a temperature range of 5° C. to 130° C.

2. A loading probe according to claim 1, wherein the elastomeric polyurethane comprises a blend of a polyol and diisocyanate (polymeric MDI).

3. A loading probe according to claim 2, wherein the polyol comprises Daltocel F438 and the diisocyanate comprises Suprasec 5005.

4. A loading probe according to claim 3, wherein the blend further comprises a chain extender, a catalyst and silicon nitride.

5. A loading probe according to claim 4, wherein the chain extender comprises 1,4 butane diol and the catalyst comprises Thorcat 535.

6. A loading probe according to claim 5, wherein the blend comprises the following percentages by weight:

| Material | Percentage by weight |
| --- | --- |
| Polyol | 35.4 |
| Diisocyanate | 28.7 |
| Chain extender | 6.4 |
| Catalyst | 0.1 |
| Silicon nitride (powder) | 29.4 |

7. A loading probe according to claim 1, wherein the elastomeric polyurethane material further contains silicon dioxide, silicon nitride, tungsten powder, tungsten carbide, tungsten boride, tungsten silicide, molybdenum powder, molybdenum carbide, molybdenum nitride, tantalum powder, tantalum carbide or tantalum nitride in an amount up to 10% by volume chosen to match the acoustic impedance of the second body portion material to that of the first body portion material.

8. A loading probe according to claim 1, wherein the second body portion is made from discrete stages or layers of elastomeric polyurethane material, with each stage or layer having differing properties sequentially along the second body portion.

9. A loading probe according to claim 1, wherein the second body portion is made from continuously graded elastomeric polyurethane material.

10. A loading probe according to claim 1, wherein the first material from which the first body portion is made is a polycarbonate, polyethylene terephthalate or polyethersulphone having a low absorption coefficient over a temperature range of 5° C. to 200° C.

11. A loading probe according to claim 1, wherein the first and second body portions are attached to one another by a projection provided at one end of one of the portions engaging in a correspondingly shaped recess provided in one end of the other body portion.

12. A loading probe according to claim 11, wherein the projection and recess are conical in shape.

13. A loading probe according to claim 1, having a maximum thermal capacity of around 20 kJ.

14. A loading probe according to claim 13, having a power density of up to 5 W per mm2.

15. A loading probe according to claim 1, wherein the acoustic impedance characteristics are substantially matched in accordance with the following relationship:

$$\rho_1 \times c_1 = \rho_2 \times c_2$$

where $\rho_1$ is the density of the material from which the first body portion is made;

$\rho_2$ is the density of the material from which the second body portion is made;

c1 is the speed of sound in the material from which the first body portion is made; and c2 is the speed of sound in the material from which the second body portion is made.

16. A loading probe according to claim 1, wherein the second body portion utilised is formed by moulding.

17. A loading probe according to claim 1, constructed and dimensioned to simulate the operating medium.

18. A loading probe according to claim 17, wherein the operating medium is water.

19. A loading probe according to claim 18, wherein the impedance match to water is achieved over an octave frequency by a waisted profile provided by two frusto-conical sections.

20. A loading probe according to claim 19, wherein the frequency range over which the octave frequency operates is from 1 to 50 kHz.

21. A loading probe according to claim 1, operable to test an acoustic transducer in air.

22. A loading probe according to claim 1, wherein the first body portion is substantially circular in cross section having a waisted profile formed by two intersecting opposed frusto-conical sections, dimensioned to assist matching of the acoustical impedance of the first body portion to that of the medium in which the transducer to be tested is to operate.

23. A loading probe according to claim 1, wherein the piezo-electric test element is carried by the first body portion intermediate the ends of the first body portion.

24. A loading probe according to claim 1, wherein the piezo-electric test element is carried by the first body portion at the end of the first body portion opposite to said one end thereof.

25. Measurement apparatus for measuring the acoustic properties of a material, the apparatus comprising two loading probes according to claim 1, arranged end to end with material to be measured sandwiched therebetween.

26. Apparatus according to claim 25, wherein one of the piezo-electric test elements transmits an acoustic signal and the other piezo-electric test element measures the received signal characteristics.

27. Apparatus according to claim 26, wherein absorption coefficient data of the material is determined in accordance with the reduction in signal amplitude received at the other piezo-electric test element.

28. Apparatus according to claim 27, wherein phase velocity data is determined by measuring the phase delay in receiving the signal at the other piezo-electric test element.

29. A loading probe according to claim 6, wherein the elastomeric polyurethane material further contains silicon dioxide, silicon nitride, tungsten powder, tungsten carbide, tungsten boride, tungsten silicide, molybdenum powder, molybdenum carbide, molybdenum nitride, tantalum powder, tantalum carbide or tantalum nitride in an amount up to 10% by volume chosen to match the acoustic impedance of the second body portion material to that of the first body portion material.

30. A loading probe according to claim 29, wherein the second body portion is made from discrete stages or layers of elastomeric polyurethane material, with each stage or layer having differing properties sequentially along the second body portion.

31. A loading probe according to claim 29, wherein the second body portion is made from continuously graded elastomeric polyurethane material.

32. A loading probe according to claim 29, wherein the first material from which the first body portion is made is a polycarbonate, polyethylene terephthalate or polyethersulphone having a low absorption coefficient over a temperature range of 5° C. to 200° C.

33. A loading probe according to claim 29, wherein the first and second body portions are attached to one another by a projection provided at one end of one of the portions engaging in a correspondingly shaped recess provided in one end of the other body portion.

34. A loading probe according to claim 6, having a maximum thermal capacity of around 20 kJ.

35. A loading probe according to claim 34, having a power density of up to 5 W per mm2.

36. A loading probe according to claim 29, having a maximum thermal capacity of around 20 kJ.

37. A loading probe according to claim 36, having a power density of up to 5 W per mm2.

38. A loading probe according to claim 6, constructed and dimensioned to simulate the operating medium.

39. A loading probe according to claim 38, wherein the operating medium is water.

40. A loading probe according to claim 39, wherein the impedance match to water is achieved over an octave frequency by a waisted profile provided by two frusto-conical sections.

41. A loading probe according to claim 40, wherein the frequency range over which the octave frequency operates is from 1 to 50 kHz.

42. A loading probe according to claim 29, constructed and dimensioned to simulate the operating medium.

43. A loading probe according to claim 42, wherein the operating medium is water.

44. A loading probe according to claim 43, wherein the impedance match to water is achieved over an octave frequency by a waisted profile provided by two frusto-conical sections.

45. A loading probe according to claim 44, wherein the frequency range over which the octave frequency operates is from 1 to 50 kHz.

46. Apparatus according to claim 26, wherein phase velocity data is determined by measuring the phase delay in receiving the signal at the other piezo-electric test element.

47. Measurement apparatus for measuring the acoustic properties of a material, the apparatus comprising two loading probes according to claim 6, arranged end to end with material to be measured sandwiched therebetween.

48. Measurement apparatus for measuring the acoustic properties of a material, the apparatus comprising two loading probes according to claim 7, arranged end to end with material to be measured sandwiched therebetween.

49. Measurement apparatus for measuring the acoustic properties of a material, the apparatus comprising two loading probes according to claim 10, arranged end to end with material to be measured sandwiched therebetween.

50. Measurement apparatus for measuring the acoustic properties of a material, the apparatus comprising two loading probes according to claim 11, arranged end to end with material to be measured sandwiched therebetween.

51. Measurement apparatus for measuring the acoustic properties of a material, the apparatus comprising two loading probes according to claim 13, arranged end to end with material to be measured sandwiched therebetween.

52. Apparatus according to claim 51, wherein at least one loading probe has a power density of up to 5 W per mm2.

* * * * *